US011592932B2

(12) United States Patent
Hong et al.

(10) Patent No.: US 11,592,932 B2
(45) Date of Patent: Feb. 28, 2023

(54) POSITION DETECTION IN ROLLABLE DISPLAYS

(71) Applicant: STMicroelectronics Asia Pacific Pte Ltd., Singapore (SG)

(72) Inventors: Sa Hyang Hong, Seoul (KR); Sang Hoon Jeon, Seoul (KR); Yun Sang On, Yongin (KR); Min Sang Kim, Bakdal 1-dong (KR)

(73) Assignee: STMicroelectronics Asia Pacific Pte Ltd., Singapore (SG)

( * ) Notice: Subject to any disclaimer, the term of this patent is extended or adjusted under 35 U.S.C. 154(b) by 0 days.

(21) Appl. No.: 17/201,956

(22) Filed: Mar. 15, 2021

(65) Prior Publication Data
US 2022/0291800 A1 Sep. 15, 2022

(51) Int. Cl.
*G06F 3/044* (2006.01)
*G06F 3/041* (2006.01)
*G09F 9/30* (2006.01)
*G06F 1/16* (2006.01)

(52) U.S. Cl.
CPC ........ *G06F 3/04166* (2019.05); *G06F 3/0442* (2019.05); *G06F 3/0446* (2019.05); *G06F 1/1652* (2013.01); *G06F 2203/04102* (2013.01); *G09F 9/301* (2013.01)

(58) Field of Classification Search
CPC .. G06F 3/04166; G06F 3/0442; G06F 3/0446; G06F 1/1652; G06F 2203/04102; G09F 9/301
See application file for complete search history.

(56) References Cited

U.S. PATENT DOCUMENTS

| 6,771,232 | B2 | 8/2004 | Fujieda et al. |
| 7,639,237 | B2 | 12/2009 | Perkins |
| 8,928,635 | B2 | 1/2015 | Harley et al. |
| 9,911,369 | B2 | 3/2018 | Kim et al. |
| 10,146,257 | B2 | 12/2018 | Alonso et al. |
| 10,424,272 | B2 | 9/2019 | Yoon et al. |
| 10,503,307 | B2 | 12/2019 | Hong et al. |
| 2010/0033435 | A1 | 2/2010 | Huitema |
| 2013/0285922 | A1* | 10/2013 | Alberth, Jr. ........... G06F 1/1694 345/173 |
| 2015/0153777 | A1* | 6/2015 | Liu ....................... G06F 1/1652 345/173 |
| 2017/0286042 | A1* | 10/2017 | Lee ....................... G06F 3/0482 |
| 2018/0374452 | A1 | 12/2018 | Choi et al. |
| 2019/0121471 | A1* | 4/2019 | Takizawa ............ G02F 1/13338 |

(Continued)

FOREIGN PATENT DOCUMENTS

JP 2013521548 A * 6/2013 ......... G06F 3/04184

*Primary Examiner* — Towfiq Elahi
(74) *Attorney, Agent, or Firm* — Slater Matsil, LLP

(57) ABSTRACT

A method for operating an electronic device, the method including: displacing a rollable touchscreen to a first position along a first direction, a first side of the rollable touchscreen being mounted in a housing, the rollable touchscreen being configured to be rolled into or unrolled out of the housing along the first direction, detecting an active electrode at a first location on the rollable touchscreen, the active electrode being mounted in the housing, and determining the first position of the rollable touchscreen based on the first location, the first positing being indicative of a fractional amount of the rollable touchscreen outside the housing.

23 Claims, 5 Drawing Sheets

(56) References Cited

U.S. PATENT DOCUMENTS

2020/0076940 A1* 3/2020 Kim ................... G06F 1/1656
2020/0341591 A1   10/2020 You et al.
2020/0409491 A1* 12/2020 Maharyta ............... G06F 3/044

* cited by examiner

POSITION DETECTION IN ROLLABLE DISPLAYS

TECHNICAL FIELD

The present invention relates generally to rollable displays, and, in particular, embodiments to position detection in rollable displays.

BACKGROUND

Electronic devices that are designed for user interaction have historically utilized external input devices such as keyboards, key pads, and/or mice to capture user input. In recent years, there has been a push away from the more traditional methods, as consumers prefer the convenience of portable devices that can support a more flexible lifestyle. To this end, there has been a rise in smaller, portable, hand-held electronic devices, such as mobile phones, tablets, gaming systems, etc. This has given rise to the popularity of touch screens and touch panel displays as systems for capturing user input. Not only do they provide the functionality of the traditional electronic devices, but touchscreens provide additional features. For example, given the appropriate software, users are able to utilize touchscreens for sketching, drawing, and various hand writing applications.

Electronic devices such as mobile phones, tablets, and gaming systems include a touchscreen for displaying image information. Traditionally, touchscreens are not bendable, foldable, or rollable, and therefore, the size of the display dictates the overall size of the device. Accordingly, when a large display is adopted, the size of the electronic device increases.

With the development of flexible displays that are capable of being rolled up, the size of a display may be increased without increasing the size of the device. However rollable displays come with their own set of advantages and disadvantages. Rollable displays have to detect the displacement of a rollable display (i.e. the fraction of the surface of the display that is rolled or unrolled) to determine the distance to project an image. However, the detection has to be performed without significantly increasing costs and power consumption.

SUMMARY

In accordance with an embodiment of the invention, a method for operating an electronic device includes displacing a rollable touchscreen to a first position along a first direction, a first side of the rollable touchscreen being mounted in a housing, the rollable touchscreen being configured to be rolled into or unrolled out of the housing along the first direction; detecting an active electrode at a first location on the rollable touchscreen, the active electrode being mounted in the housing; and determining the first position of the rollable touchscreen based on the first location, the first positing being indicative of a fractional amount of the rollable touchscreen outside the housing.

In accordance with another embodiment of the invention, a method for operating an electronic device includes providing a rollable display configured to be rolled into or unrolled out of a housing, the unrolled portion of the rollable display at an unrolled position extending away from the housing in a first direction, the housing including an active electrode configured to transmit a signal having a first frequency to be capacitively sensed by a capacitive touchscreen on the rollable display; determining that the rollable display is detecting the signal at a first location on the capacitive touchscreen; and determining the unrolled position of the rollable display along the first direction based on the first location on the capacitive touchscreen.

In accordance with another embodiment of the invention, an electronic device includes a first housing; an active electrode mounted in the first housing; a touch sensitive display mounted within the first housing, the touch sensitive display being configured to be rolled into or unrolled out of the first housing to an unrolled position along a first direction, and where the touch sensitive display includes a first plurality of capacitive electrodes arranged in rows across the touch sensitive display and a second plurality of capacitive electrodes arranged in columns across the touch sensitive display; a processor; a memory for storing a program to be executed in the processor, the program including instructions when executed cause the processor to: determine the touch sensitive display is detecting an active electrode at a first location on the touch sensitive display; and determine a first position of the touch sensitive display based on the first location, the first positing being indicative of a fractional amount of the touch sensitive display outside the housing.

BRIEF DESCRIPTION OF THE DRAWINGS

For a more complete understanding of the present invention, and the advantages thereof, reference is now made to the following descriptions taken in conjunction with the accompanying drawings, in which:

FIGS. 1A-1G illustrate an electronic device having a rollable touchscreen that is configured to be rolled or unrolled into a housing and determine the unrolled position of the rollable touchscreen in accordance with an embodiment of the invention, wherein FIG. 1A illustrates a side view of the electronic device with the rollable touchscreen in a fully rolled position, FIG. 1B illustrates a side view of the electronic device with the rollable touchscreen in a fully unrolled position, FIG. 1C illustrates a side view of the electronic device with the rollable touchscreen in a partially unrolled position, FIG. 1D illustrates a side view of an area of the electronic device, FIG. 1E illustrates an implementation of the rollable touchscreen on the front facing side of the electronic device, and FIG. 1F illustrates a schematic of the rollable touchscreen; and FIG. 1G illustrates a schematic of the electronic device according to an embodiment of the present application;

FIG. 4A illustrates a side view of the electronic device with the touch sensitive display in a fully rolled position, FIG. 4B illustrates a side view of the electronic device with the touch sensitive display in a fully unrolled position, and FIG. 4C illustrates a side view of the electronic device with the touch sensitive display in a partially unrolled position.

DETAILED DESCRIPTION OF ILLUSTRATIVE EMBODIMENTS

The structure, method, and using of various embodiments of an electronic device are discussed in detail below. However, it should be valued that the various embodiments detailed herein may be applicable in a wide variety of disciplines. The specific embodiments described herein are merely illustrative of specific ways to make and use various embodiments.

While flexible displays have led to great advances in the evolution of portable electronic devices, due to their delicate nature there are still limitations that exist. Namely, flexible displays capable of being enlarged by unrolling and reduced by rolling require additional electrical components and/or additional layers to detect the unrolled display position which can lead to an increase in display thickness, an increase in power consumption, and an increase in manufacturing costs.

Embodiments of the present invention relate to an electronic device that can reliably detect and accurately report the unrolled position of a flexible display without increasing power consumption and without adding any additional layers to the flexible display. Various embodiments of the present application disclose a device and a method to reliably detect the unrolled position of a flexible display without adding additional electrical components or layers to the flexible display.

An electronic device with a rollable touch sensitive display for determining the unrolled position of the touch sensitive display will be described using FIGS. 1A-1F.

Figure 1A:
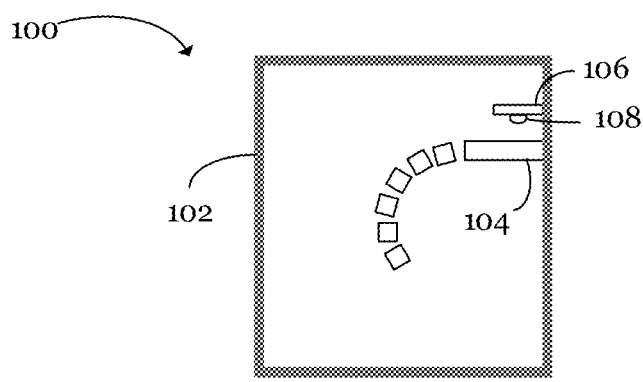

FIG. 1A illustrates a schematic detailing of an embodiment of an electronic device 100 configured with a rollable touchscreen 104. The electronic device 100 comprises a housing structure 102 storing a rollable touchscreen 104. The housing structure 102 may comprise auxiliary components (i.e. speakers, microphones, switches, etc.) that have been assembled into the housing structure 102 to provide various functionalities to the electronic device 100. The housing structure 102 may further include an opening for which a rollable touchscreen 104 can extend out.

The housing structure 102 includes an active electrode 108 positioned close to the rollable touchscreen 104. In various embodiments, the active electrode 108 may be an active tip made out of a conductive material such as metal, conductive paint, conductive ink, or any other suitable conductive material. In other embodiments, the active electrode 108 may comprise an exposed pattern of copper, gold, or any other conductive metal. The active electrode 108 may be coupled to an active electrode controller 106 that is mounted within the housing structure 102. In one or more embodiments, the active electrode 108 is mounted in the housing structure 102 in a manner such that there is a distance between the active electrode 108 and the rollable touch screen 104 (or roughly an opening of the housing 102).

Figure 1B:
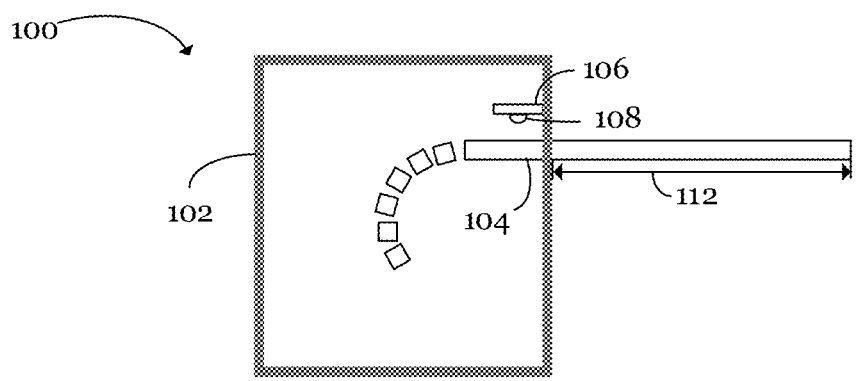

FIG. 1B illustrates a schematic detailing of an embodiment of the side of the electronic device 100 when the rollable touchscreen 104 is in the fully unrolled position.

Referring to FIG. 1B, a first side of the rollable touchscreen 104 is mounted within the housing structure 102 and is configured to be rolled into or unrolled out of the housing structure 102 in a direction perpendicular to the housing structure 102.

Figure 1C:
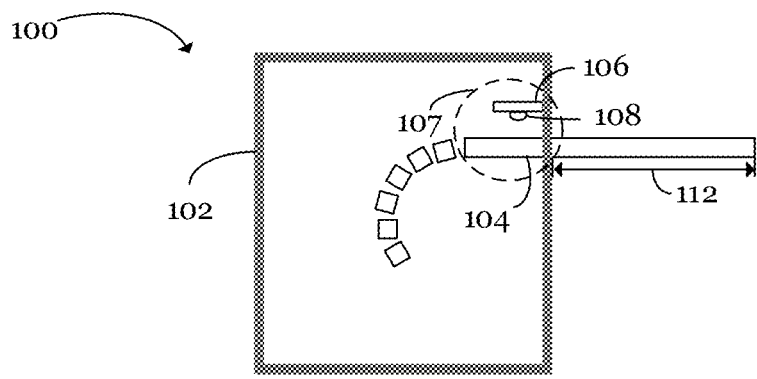

In some embodiments, a flexible display 122 (FIG. 1E) may be situated on the front facing side of the electronic device 100. The flexible display 122 may comprise a light emitting diode (LED) flexible display, organic LED flexible display, or any other type of flexible display. The rollable touchscreen 104 may be unrolled in a direction perpendicular to the housing structure 102 to an unrolled position 112 as illustrated in FIGS. 1B-1C. The distance from the housing structure 102 is the unrolled position 112 and hence defined as the distance between the far end of the rollable touchscreen 104 and the housing structure 102 (i.e. the distance to project an image across the flexible touch sensitive display).

FIG. 1C illustrates a schematic detail of an embodiment of the electronic device 100 when the rollable touchscreen 104 is in a partially unrolled position. Referring to FIG. 1C, in one or more embodiments, the rollable touchscreen 104 may be rolled from the fully unrolled display to a partially unrolled position. The rollable touchscreen 104 may be rolled or unrolled to any unrolled position 112 between the fully rolled position and the fully unrolled position. For example, the rollable touchscreen 104 can be unrolled from the fully rolled position to the fully unrolled position, from the fully rolled position to a partially unrolled position, from any partially unrolled position to another partially unrolled position, from any partially unrolled position to a fully unrolled position, or any other combination thereof.

In one or more embodiments, the rollable touchscreen 104 may be rolled or unrolled manually using a mechanical driving unit or automatically using an electromechanical driving unit.

In the illustrations shown in FIGS. 1A-1C, the front display of the electronic device 100 is oriented so that the rollable touchscreen 104 is placed in a landscape mode of operation. In the landscape mode of operation, the rollable touchscreen 104 is rolled or unrolled in a horizontal direction. In other embodiments of the electronic device 100, the front display can be oriented so that the rollable touchscreen 104 is placed in a portrait mode of operation that is rolled or unrolled in a vertical direction.

Figure 1D:
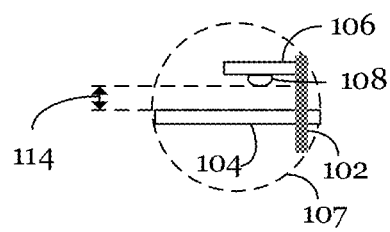

FIG. 1D illustrates an enlarged schematic detailing of the electronic device 100 within a circular area 107.

Referring to FIG. 1D, the active electrode 108 may be coupled to an active electrode controller 106 within the housing 102. In various embodiments, the active electrode controller 106 may comprise a circuit board on which a plurality of components are mounted. In various embodiments, the active electrode controller 106 may be configured to drive an active signal towards a rollable display element on the rollable touchscreen 104 that is proximate to the active electrode 108. In one or more embodiments, the circuit board of the active electrode controller 106 may be a printed circuit board (PCB).

In various embodiments the active electrode 108 may be mounted in a manner such that there is a distance 114 between the rollable touchscreen 104 and the active electrode 108. In various embodiments, the active electrode 108 may be mounted in a manner such that the distance 114 is as small as possible without contacting the rollable touchscreen. In various embodiments the distance 114 may be less than 1 mm, such as between 0.1 mm to 0.5 mm for example.

Figure 1E:
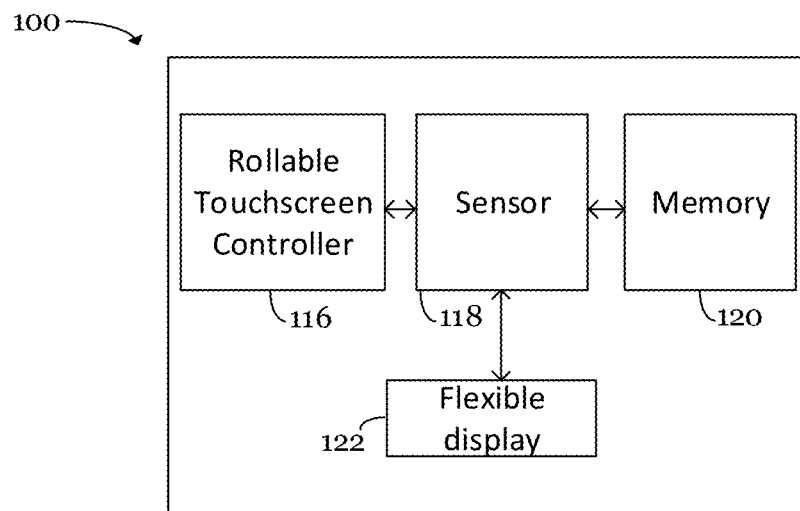

FIG. 1E illustrates an implementation of the rollable touchscreen 104 on the front facing side of the electronic device 100 according to an embodiment of the present application.

Referring to FIG. 1E, the front facing side of the electronic device 100 may include a rollable touchscreen controller 116, a sensor 118, a memory 120, and a flexible display 122 which may be electronically coupled to each other through a bus. In various embodiments, the flexible display 122 and the rollable touchscreen 104 may be integrated in one component.

In various embodiments, the rollable touchscreen controller 116 may include a processor that analyzes information and carries out a series of executable scripts, e.g., stored in the memory 120, based on user input. In one or more embodiments, the processor may comprise an application-specific integrated circuit (ASIC) device, a system on chip (SOC), or any other processing unit known in the art. In various embodiments, the rollable touchscreen controller 116 may comprise a number of separate computing units such as cores integrated within one processor, or distinct separate processing chips. In other embodiments, some of the rollable touchscreen controller 116 may be integrated with the sensor 118.

The memory 120 may be programmed for short term and/or long term memory storage. The memory 120 may comprise various programs to be executed in the rollable touchscreen controller 116. The memory 120 may include both volatile and non-volatile memories. The memory 120 is designed to retain information generated by the processor 116 so it can be recalled at a later time.

The rollable touchscreen 104 is designed to register user input via touches made to its surface. In various embodiments, the rollable touchscreen 104 may also register input from the active electrode 108. In other embodiments of the electronic device 100, input from the rollable touchscreen 104 may also come from input given from a stylus (an active or passive) device. The sensor 118 may include the rollable touchscreen 104 as well as other sensors such as gyroscopes or accelerometers. One or more of the sensors may be integrated together.

As explained above, the rollable touchscreen 104 may be rolled or unrolled into a variety of unrolled positions 112 perpendicular to the housing structure 102, and therefore, may require extra power consuming circuit components to constantly monitor and determine its unrolled position 112.

Figure 1F:
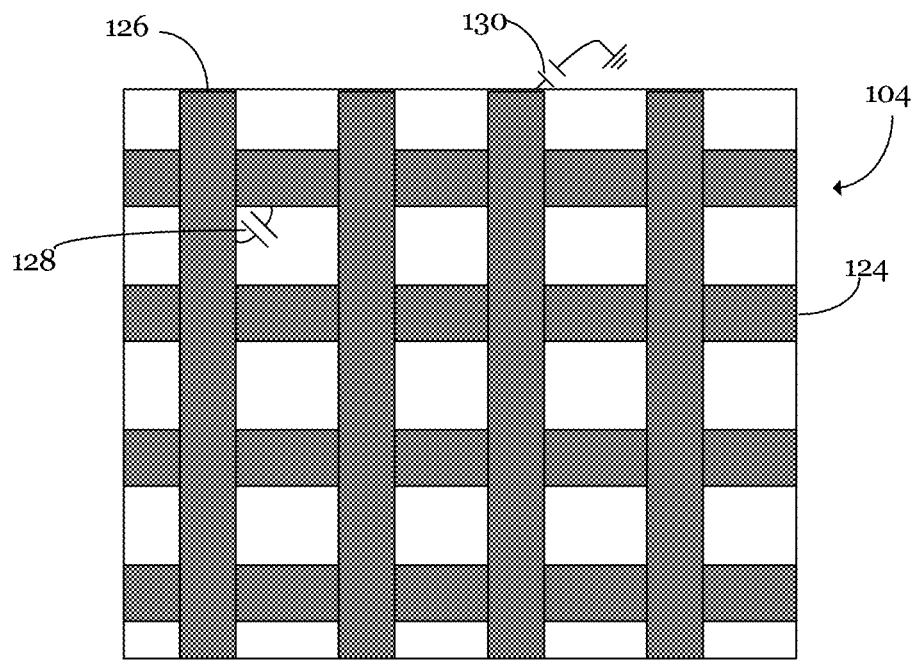
Figure 1G:
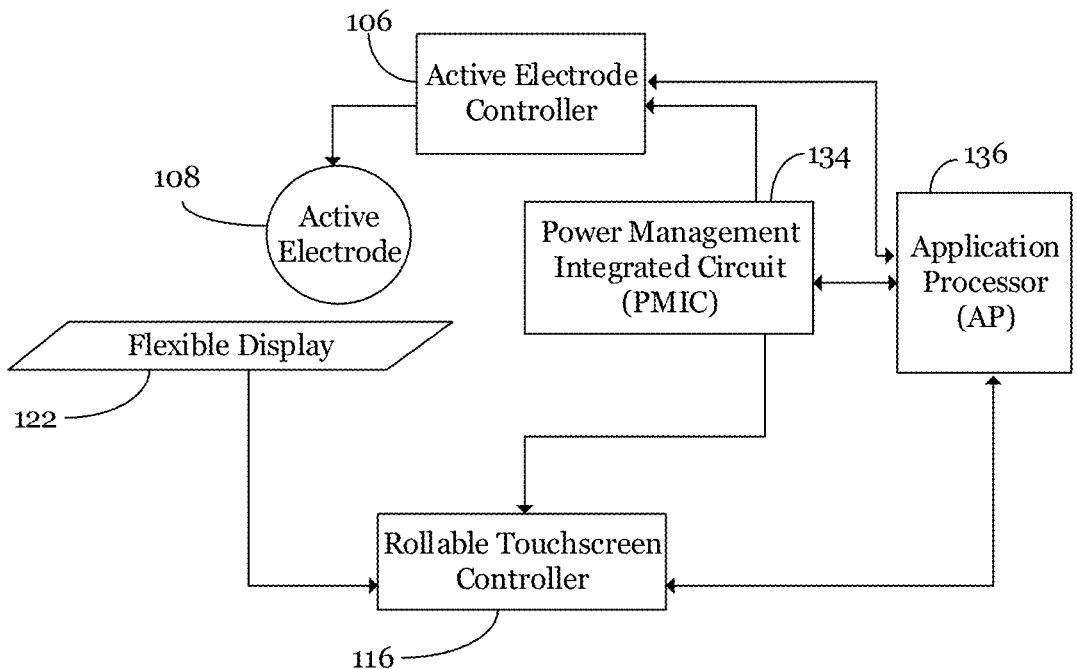

To overcome issues related to extra power consuming components required to monitor and determine the unrolled position of the rollable touchscreen 104, embodiments as described using FIGS. 1F-1G describe how to determine the position of the rollable touchscreen 104 based on a detected location of the active electrode 108.

FIG. 1F illustrates a schematic of the rollable touchscreen 104. In various embodiments, the rollable touchscreen 104 is electrically coupled to a first plurality of capacitive electrodes 124 and a second plurality of capacitive electrodes 126 that span the entirety of the rollable touchscreen 104 in a grid-like fashion. The rows of the first plurality of capacitive electrodes 124 and the columns of the second plurality of capacitive electrodes 126 have a measurable mutual capacitance so as to form a matrix of mutual capacitors 128. In addition, each of the rows of the first plurality of capacitive electrodes 124 and each of the columns of the second plurality of capacitive electrodes 126 may have a self-capacitance 130 that may be measured with respect to ground.

FIG. 1G illustrates a schematic of the electronic device 100 according to an embodiment of the present application.

Referring to FIG. 1G, as mentioned earlier, the active electrode 108 may be mounted to an active electrode controller 106 in the housing structure 102 at a distance 114 above a rollable touchscreen 104 that may be integrated into the flexible display 122.

In various embodiments, detecting the active electrode 108 involves transmitting a signal through the active electrode 108, and detecting the presence of a charge due to the transmitted signal sensed between intersecting electrodes (the first plurality of capacitive electrodes 124 and the second plurality of capacitive electrodes 126) by scanning each of the rows comprising the first plurality of capacitive electrodes 124 and the second plurality of capacitive electrodes 126.

In other words, the active electrode controller 106 may be configured to generate a signal that may be transmitted through the active electrode 108. As the active electrode 108 transmits the signal, electric field lines are generated that may capacitively couple the active electrode 108 to intersecting electrodes and impart an additional capacitance. In one or more embodiments, the additional capacitance may be a charge in the form of a current that may be measured. As both of the rows and columns of capacitive electrodes are scanned, the capacitances at each intersection may be determined by the rollable touchscreen controller 116. Then based on the determined capacitances, the rollable touchscreen controller 116 may determine the location of the rollable touchscreen 104 that detects the active electrode 108.

In various embodiments, the rollable touchscreen controller 116 may comprise an integrated circuit that is compatible to support an active stylus pen. For example, in certain embodiments, the rollable touchscreen controller 116 may be simultaneously shared by an active stylus pen from the user and the active electrode 108. The integrated circuit used as a rollable touchscreen controller 116 is not limited by this disclosure.

By using an active electrode, embodiments of the present application are able to easily distinguish from other sensing operations of the rollable touchscreen 104. For example, the rollable touchscreen 104 may be configured to sense a user's fingers, a pen stylus, which may be active or passive, and other touch operations. However, these touch operations of the rollable touchscreen 104 have to be clearly distinguishable from the sensing performed by the active electrode 108.

The rollable touchscreen 104 may detect user input using various user induced capacitive sensing processes such as mutual and self sensing capacitive sensing processes. Embodiments of the present application can distinguish between the sensing of the active electrode 108 from other user induced capacitive sensing processes. Each of these will be discussed individually below.

A mutual sensing process may include, using the rollable touchscreen controller 116, driving each row of the first plurality of capacitive electrodes 124 sequentially, and measuring the change in capacitance due to a change in a dielectric medium between the intersecting electrodes of the second plurality of capacitive electrodes 126 and a respective driven row of the first plurality of capacitive electrodes 124 (or vice versa).

In other words, during the mutual sensing process, when a row of the first plurality of capacitive electrodes 124 is driven, electric fields form between adjacent electrodes of the driven row and the respective intersecting columns of the second plurality of capacitive electrodes 126. When capacitive objects such as human fingers or a passive stylus touch the rollable touchscreen 104, the electric field lines going through the air between adjacent electrodes is replaced to pass through the capacitive objects. These interruptions in the electric fields cause a detectable in change the mutual capacitance of the mutual capacitors 128 (e.g. alters the capacitive coupling between rows and columns) where the touches occurred.

Similarly, the rollable touchscreen 104 may detect some types of user input using a self-sensing capacitive sensing process.

The self-sensing process operates by measuring a change in the sensed capacitance of each of the first plurality of capacitive electrodes 124 or each of the second plurality of capacitive electrodes 126. In other words, the self-sensing process may include the rollable touchscreen controller 116 driving (with a voltage) and scanning each of the individual rows of the first plurality of capacitive electrodes 124, each of the individual columns of the second plurality of capacitive electrodes 126, or both. When a human finger (or another capacitive object) is brought proximate to a driven row or column of electrodes it adds an additional capacitance that can be measured.

In various embodiments, in order to allow the rollable touchscreen 104 to detect the difference between a capacitive touch (e.g. touch from a finger or a passive stylus) and touch from the active electrode 108, the modulated signal transmitted by the active electrode 108 and the signals used to drive the capacitive electrodes coupled to the rollable touchscreen 104 during both the capacitive sensing processes may be generated with different frequencies. For example, a driving signal of with a frequency of 320 kHz may be used during mutual sensing, a driving signal with a frequency of 120 kHz may be used during self-sensing, and a modulated signal driven with a frequency of 200 kHz may be transmitted by the active electrode 108. In other embodiments, touch from the active electrode 108 may be differentiated by time-multiplexing the modulated signal transmitted by the active electrode 108 and the signals used to during both capacitive sensing processes. For example, if the total sensing operations are performed over a time period of 10 ms during rollable touchscreen sensing, 9 ms may be allocated to capacitive sensing processes and 1 ms may be used to drive the signal generated by the active electrode 108.

In one or more embodiments, the signal transmitted by the active electrode 108 may follow a known protocol that may be used to by signals that are transmitted by an active tip of a stylus pen. For example the signal loaded onto the active electrode 108 may follow protocols such as the universal stylus initiative (USI) standard protocol, the Wacom™ WGP active pen protocol, the Microsoft Pen Protocol (MPP), the HP Pen Protocol (HPP) or the like.

Referring back to FIG. 1G, the changes in capacitance detected by the rollable touchscreen 104 may be determined by the rollable touchscreen controller 116. The rollable touchscreen controller 116, based on the driving signal of the active electrode 108 and the driving signals used during both capacitive sensing processes, may determine the coordinates of the location the rollable touchscreen 104 is detecting the active electrode 108.

In various embodiments of the invention, the rollable touchscreen controller 116 may be coupled to and configured to execute a program that is stored in memory 120 based on the inputs received at the sensor 118. For example, the memory 120 may comprise a program comprising instructions to execute the flow chart of FIG. 3.

In various embodiments, the rollable touchscreen 104 may be further configured to detect contact from an active stylus. In one or more embodiments, the active stylus may be an active stylus that uses the same type of controller that is used as the active electrode controller 106. Advantageously, because the active stylus and the active electrode 108 use the same type of controller, the protocols of the controllers will have unique stylus IDs. One advantage of this is that when an active stylus is brought proximate to the rollable touchscreen 104, the rollable touchscreen controller 116 is able to decipher whether it is detecting the active electrode 108 or the active stylus.

In other embodiments, the rollable touchscreen controller 116 may be able to decipher whether it is detecting the active electrode 108 or an active stylus based on the frequency, duty cycle or voltage of their respective signals.

In various embodiments, referring to FIG. 1G, after determining the coordinates of the location(s) of touch by the active electrode 108 and other objects (if any), the rollable touchscreen controller 116 may report the coordinates of each location to an application processor (AP) 136. In one or more embodiments, the AP 136 may be configured to transmit data corresponding to an image to be projected by the flexible display 122. Based on the coordinates received by the AP 136, the AP may determine the unrolled position 112 of the rollable touchscreen 104 and transmit the image data based on the unrolled position 112 of the rollable touchscreen 104. In various embodiments, AP 136 may determine the unrolled position 112 of the rollable touchscreen 104 by taking the difference of coordinate of the detected location of the active electrode 108, and the fully unrolled length of the rollable touchscreen 104.

The power management integrated circuit 134 provides power supply to all the components including the AP 136 and may include a power supply such as a switched-mode power supply. The power management integrated circuit 134 may be controlled by the application processor 136. In various embodiments, the rollable touchscreen controller 116 and the active electrode controller 106 may be powered by a power management integrated circuit 134 (PMIC) that is coupled to the AP 136.

Based on the coordinates determined by the AP 136, the AP 136 may instruct the PMIC 134 how much power to supply to both controllers. Advantageously, embodiments of the present application are able to detect the unrolled position of the rollable touchscreen 104 without expending significant power. For example, the power requirement of generating the active signal at the active electrode controller 106 and transmitting it through the active electrode 108 is minimal especially since it is activated only when the location of the rollable touchscreen 104 has to be determined.

Figure 2A:
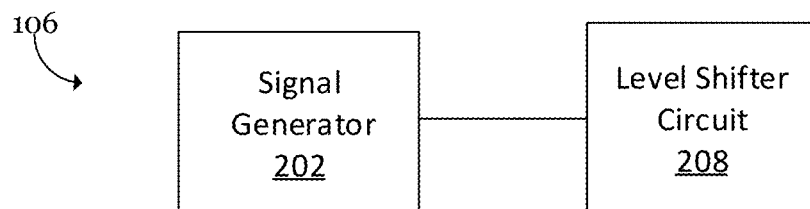
FIG. 2A illustrates an active electrode controller in accordance with an embodiment of the present application.

FIG. 2A illustrates an active electrode controller in accordance with an embodiment of the present application.

The active electrode controller 106 may comprise a signal generator 202 configured to generate a drive signal for the active electrode 108. In one or more embodiments, the signal generator 202 may include a generation circuit that is configured to receive a CLK signal from an internal clock (or alternately an external clock) and generate a waveform. For example, the waveform generator may generate a wave, which may be a square wave, sawtooth wave or other waveforms. The signal generator 202, at the modulation circuit, receives a modulating signal, for example, from the application processor 136 discussed above, and generates a pulse width modulated (PWM) signal. For example, this may be performed by providing the modulating signal and the waveform to a comparator, i.e., the modulation circuit comprising the comparator. In further embodiments, the modulating signal may be a digital signal or an analog signal, which may be processed by the signal generator 202.

A person having ordinary skill in the art will be aware of other ways to obtain a PWM signal.

In various embodiments, the signal generator 204 may be further connected to a level shifter circuit 208. The level shifter circuit 208 may be configured to translate the voltage domain of the pulse width modulated signal to allow for compatibility between the active electrode controller 106 and the rollable touchscreen controller 116. The translated pulse width modulated signal may then be transmitted through the active electrode 108.

As explained above, in various embodiments, the active electrode controller 106 may include a printed circuit board (PCB) supporting a plurality of components with the PCB being mounted within the housing structure 102 of FIG. 1A-1C.

Figure 2B:
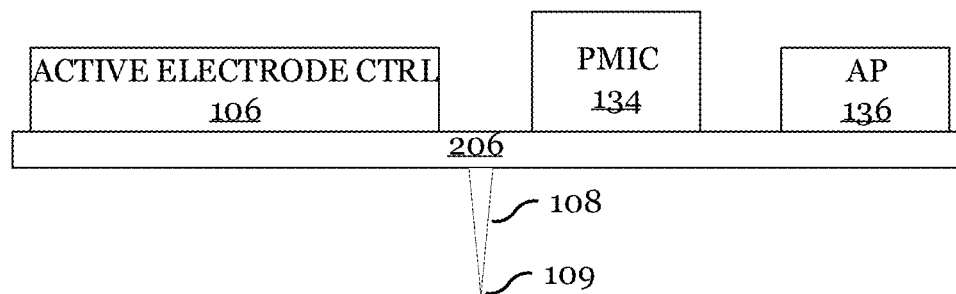
FIG. 2B illustrates a cross sectional view of a circuit board of the electronic in accordance with an embodiment of the present application.

FIG. 2B illustrates a cross sectional view of a circuit board of the electronic in accordance with an embodiment of the present application.

The active electrode controller 106 may be attached on a circuit board 206 such as a printed circuit board. If the active electrode controller 106 is implemented in a plurality of chips, each of those chips may be mounted to the circuit board 206. As an illustration, the signal generator 202 and the level shifter circuit 208 may be mounted to a first side of the circuit board 206. The signal generator 202 and the level shifter circuit 208 may be interconnected through the circuit board 206. Optionally, in further embodiments, the PMIC 134 and the AP 136 may also be mounted on the same circuit board 206.

In certain embodiments, the active electrode 108 may also be attached to the common circuit board 206, for example, the bottom surface of the circuit board (while the top surface supports the active electrode controller 106 and/or PMIC 134 and/or AP 136). The active electrode 108 may be coupled to the active electrode controller 106 using through vias in the circuit board 206. However, in further embodiments, the active electrode 108 may be mounted on a different package and may be coupled through conductive interconnects such as bond wires to the active electrode controller 106 and/or a PMIC 134 and/or AP 136.

As previously explained, the active electrode 108 may be a tip 109 mounted to the bottom of the circuit board 206 having a diameter of about 0.1 mm to about 5 mm, and about 1 mm in one embodiment. The active electrode 108 may extend out from the surface of the circuit board 206 to a distance of a few millimeters in one embodiment, for example, 1 mm to about 10 mm, and about 2 mm in one embodiment. In various embodiments, the active electrode 108 may be an exposed conductive material such as gold or copper or conductive plastic.

Figure 3:
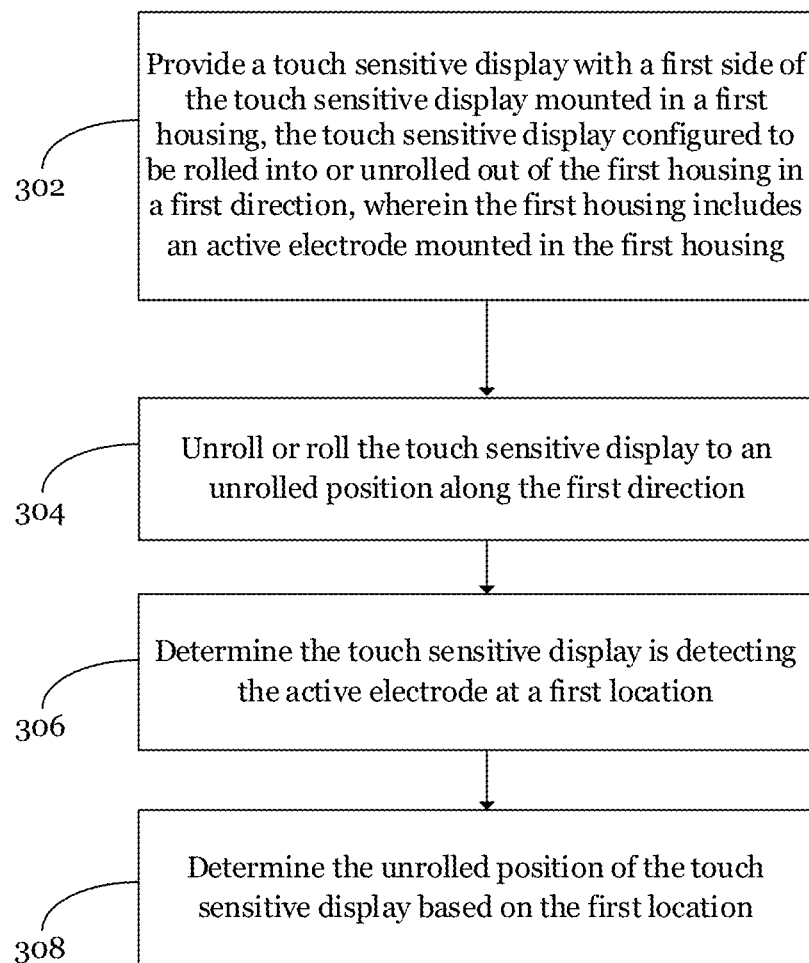
FIG. 3 illustrates a process flow to determine the unrolled position of the rollable display based on the touch location of the active electrode in accordance with an embodiment of the present application.

FIG. 3 illustrates a process flow to determine the unrolled position of the rollable display 122 based on the touch location of the active electrode 108 in accordance with an embodiment of the present application.

As illustrated in block 302 and described with reference to FIGS. 1A-1D, one side of a rollable touchscreen 104 may be mounted in a housing structure 102 of an electronic device 100. In one or more embodiments, the rollable touchscreen 104 may be configured to be rolled into or unrolled out of the housing structure 102 to an unrolled position 112 in a direction perpendicular the housing structure 102. In various embodiments, the electronic device 100 may also include an active electrode 108 mounted within the first housing. The active electrode 108 may be mounted so that there is a distance 114 between the rollable touchscreen 104 and the active electrode 108.

As next described in block 304 and described with reference to FIGS. 1A-1D, the rollable touchscreen 104 may be unrolled from the housing structure 102 to an unrolled position 112.

As next described in block 306 with reference to FIG. 1G, the rollable touchscreen controller 116 may determine the rollable touchscreen 104 is detecting the active electrode 108 at a first location. In one or more embodiments, the rollable touchscreen controller 116 may detect the active electrode 108 using the process described in FIG. 1G.

As next described in block 308, the unrolled position 112 of the rollable touchscreen 104 may be determined based on the first location. In various embodiments, after the rollable touchscreen controller 116 determines the unrolled position 112, it may report the unrolled position 112 to the application processor 136. The application processor 136 may then determine the unrolled position of the rollable touchscreen 104, report it to the power management integrated circuit (PMIC) 134, and adjust the dimensions of the image projected on the flexible display 122 accordingly.

Figure 4A:
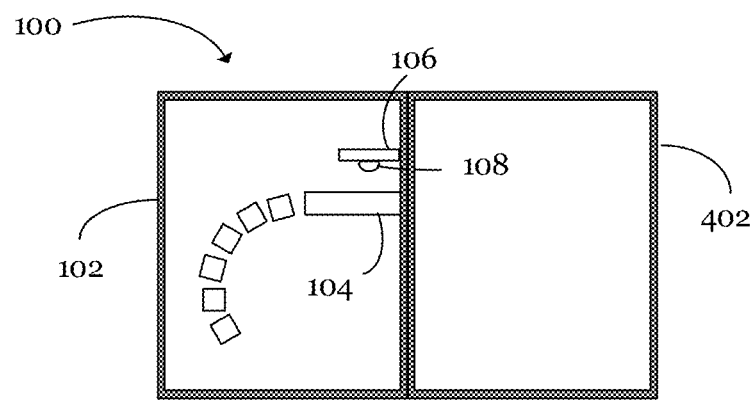
FIGS. 4A-4C illustrate an electronic device having a rollable touchscreen that is configured to be rolled or unrolled out of a housing and determine the unrolled position of the rollable touchscreen in accordance with an embodiment of the invention, where
Figure 4B:
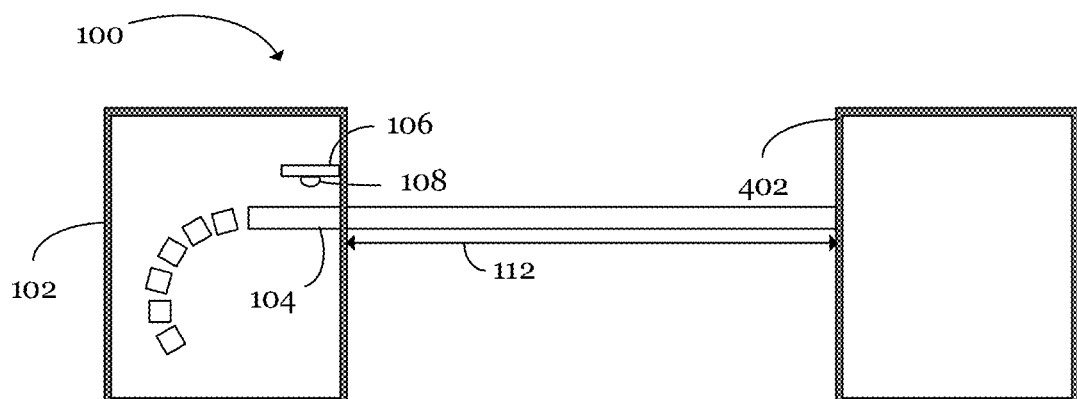
Figure 4C:
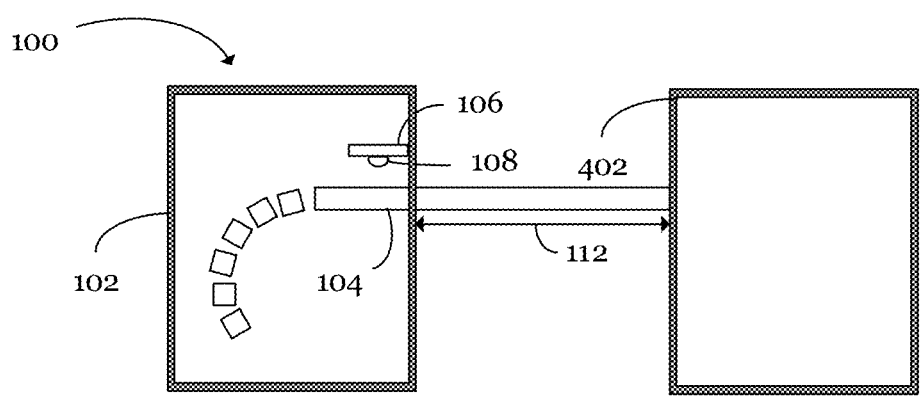

FIGS. 4A-4C illustrate an electronic device having a rollable touchscreen that is configured to be rolled or unrolled out of a housing and determine the unrolled position of the rollable touchscreen in accordance with an embodiment of the invention, where FIG. 4A illustrates a side view of the electronic device with the touch sensitive display in a fully rolled position, FIG. 4B illustrates a side view of the electronic device with the touch sensitive display in a fully unrolled position, FIG. 4C illustrates a side view of the electronic device with the touch sensitive display in a partially unrolled position.

FIG. 4A illustrates a schematic detailing of an embodiment of the electronic device 100. As illustrated in FIG. 4A, the electric device may further include a second housing 402. In one or more embodiments the far end of the rollable touchscreen 104 may be mounted to the second housing 402.

FIG. 4B illustrates a schematic detailing of an embodiment of the electronic device when the device is in the fully unrolled positon.

Referring to FIG. 4B, in one more embodiments, the rollable touchscreen 104 may be configured to be rolled out of or unrolled into the first housing structure 102 to the fully unrolled position. In various embodiments, the rollable touchscreen 104 may be unrolled out of the first housing structure 102 by extending the second housing structuring 402 away from the first housing structure in a direction perpendicular to the first housing structure 102. In other embodiments the rollable touchscreen 104 may be rolled into and unrolled out of the first housing structure 102 and the second housing structure simultaneously 402 in a scroll like fashion. For example, the user may extend the first housing and the second housing in opposite directions to enlarge the rollable touchscreen 104 (and vice versa).

Referring to FIG. 4C, the rollable touchscreen 104 may be rolled/unrolled to any unrolled position 112 between the fully rolled position and the fully unrolled position in the manner discussed in FIG. 4B above.

Example embodiments of the invention are summarized here. Other embodiments can also be understood from the entirety of the specification as well as the claims filed herein.

Example 1. A method for operating an electronic device, the method including: displacing a rollable touchscreen to a first position along a first direction, a first side of the rollable touchscreen being mounted in a housing, the rollable touchscreen being configured to be rolled into or unrolled out of the housing along the first direction; detecting an active electrode at a first location on the rollable touchscreen, the active electrode being mounted in the housing; and determining the first position of the rollable touchscreen based on the first location, the first positing being indicative of a fractional amount of the rollable touchscreen outside the housing.

Example 2. The method of example 1, where determining the first position includes: informing an application processor (AP) of the coordinates of the first location; and determining, at the AP, the unrolled position of the rollable touchscreen based on the first location.

Example 3. The method of one of examples 1 or 2, further including applying a signal at the active electrode, the signal being coupled to the rollable touchscreen through a gap disposed between the active electrode and the first location on the rollable touchscreen.

Example 4. The method of one of examples 1 to 3, where detecting the active electrode includes: transmitting, from the active electrode, a first signal; in response to transmitting the first signal, sensing a change in capacitance at each of a plurality of locations on the rollable touchscreen, the plurality of locations being arranged in rows and columns; and determining the first location based on the sensed change in capacitance.

Example 5. The method of one of examples 1 to 4, further including: performing a further sensing measurement to detect a second location of a passive touch by sensing a change in capacitance at each of the plurality of locations at a further frequency different from the frequency of the first signal, and determining the second location based on the sensed change in capacitance.

Example 6. The method of one of examples 1 to 5, further including: transmitting, from a stylus, a second signal towards the rollable touchscreen, the second signal being different from the first signal; and in response to transmitting the second signal, performing a further sensing measurement to detect a second location of the stylus.

Example 7. The method of one of examples 1 to 6, where the first signal has a first frequency and the second signal has a second frequency, and where the first frequency is different from the second frequency.

Example 8. The method of one of examples 1 to 7, where the first signal has a first frequency and a first duty cycle and the second signal has the first frequency and a second duty cycle, and where the first duty cycle is different from the second duty cycle.

Example 9. A method for operating an electronic device including: providing a rollable display configured to be rolled into or unrolled out of a housing, the unrolled portion of the rollable display at an unrolled position extending away from the housing in a first direction, the housing including an active electrode configured to transmit a signal having a first frequency to be capacitively sensed by a capacitive touchscreen on the rollable display; determining that the rollable display is detecting the signal at a first location on the capacitive touchscreen; and determining the unrolled position of the rollable display along the first direction based on the first location on the capacitive touchscreen.

Example 10. The method of example 9, where the capacitive touchscreen includes a first plurality of capacitive electrodes arranged in rows across the capacitive touchscreen and a second plurality of capacitive electrodes arranged in columns across capacitive touch screen, and where determining that the rollable display is detecting the signal at a first location on the capacitive touchscreen includes: scanning each of the columns including the second plurality of capacitive electrodes and measuring the change in capacitance at each intersection between each of the columns including the second plurality of capacitive electrodes and each respective driven row of the first plurality of capacitive electrodes; and determining the first location based on the change in capacitance between each of the rows and columns and the first frequency of the signal.

Example 11. The method of one of examples 9 or 10, further including: driving each of the rows including the first plurality of capacitive electrodes sequentially using a second frequency; scanning each of the columns including the second plurality of capacitive electrodes and measuring the change in capacitance at each intersection between each of the columns including the second plurality of capacitive electrodes and each of the rows including the first plurality of capacitive electrodes; and determining at least one first passive touch based on the change in capacitance at each intersection between the rows and columns and the second frequency.

Example 12. The method of one of examples 9 to 11, further including: driving and scanning each of the columns including the second plurality of capacitive electrodes and measuring a self-capacitance of each of the columns including the second plurality of capacitive electrodes with respect to ground, where each of the columns including the second plurality of capacitive electrodes are driven with a third frequency; and determining at least one second passive touch based on the self-capacitance of each of the columns including the second plurality of capacitive electrodes with respect to ground and the third frequency.

Example 13. An electronic device including: a first housing; an active electrode mounted in the first housing; a touch sensitive display mounted within the first housing, the touch sensitive display being configured to be rolled into or unrolled out of the first housing to an unrolled position along a first direction, and where the touch sensitive display includes a first plurality of capacitive electrodes arranged in rows across the touch sensitive display and a second plurality of capacitive electrodes arranged in columns across the touch sensitive display; a processor; a memory for storing a program to be executed in the processor, the program including instructions when executed cause the processor to: determine the touch sensitive display is detecting an active electrode at a first location on the touch sensitive display; and determine a first position of the touch sensitive display based on the first location, the first positing being indicative of a fractional amount of the touch sensitive display outside the housing.

Example 14. The electronic device of example 13, where the instructions to determine the first position include instructions to inform an application processor (AP) of the coordinates of the first location; and determine, at the AP, the unrolled position of the touch sensitive display based on the first location.

Example 15. The electronic device of one of examples 13 to 14, further including a gap disposed between the active electrode and the first location on the touch sensitive display.

Example 16. The electronic device of one of examples 13 to 15, where a length of the gap is less than 1 mm.

Example 17. The electronic device of one of examples 13 to 16, where the instructions for detecting the active electrode include instructions to: transmit, from the active electrode, a first signal; in response to transmitting the first signal, sense a change in capacitance at each of a plurality of locations on the touch sensitive display, the plurality of locations being arranged in rows and columns; and determine the first location based on the sensed change in capacitance.

Example 18. The electronic device of one of examples 13 to 17, where the program includes further instructions to: perform a further sensing measurement to detect a second location of a passive touch by sensing a change in capacitance at each of the plurality of locations at a further frequency different from the frequency of the first signal, and determining the second location based on the sensed change in capacitance.

Example 19. The electronic device of one of examples 13 to 18, where the program includes further instructions to: transmit, from a stylus, a second signal towards the touch sensitive display, the second signal being different from the first signal; and in response to transmitting the second signal, perform a further sensing measurement to detect a second location of the stylus.

Example 20. The electronic device of one of examples 13 to 19, where the first signal has a first frequency and the second signal has a second frequency, and where the first frequency is different from the second frequency; or where the first signal has a first frequency and a first duty cycle and the second signal has the first frequency and a second duty cycle, and where the first duty cycle is different from the second duty cycle.

Example 21. The electronic device of one of examples 13 to 20, where the active electrode includes gold or copper.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for operating an electronic device, the method comprising:
    displacing a rollable touchscreen to a first position along a first direction, a first side of the rollable touchscreen being mounted in a housing, the rollable touchscreen being configured to be rolled into or unrolled out of the housing along the first direction;
    detecting an active electrode at a first location on the rollable touchscreen from amongst a plurality of locations on the rollable touchscreen configured to detect the active electrode, the active electrode being mounted in the housing, wherein detecting the active electrode comprises distinguishing an interaction between the rollable touchscreen and the active electrode mounted in the housing from touch operations registered on an unrolled portion of the touchscreen outside the housing; and
    determining the first position of the rollable touchscreen based on the first location, the first position being indicative of a fractional amount of the rollable touchscreen outside the housing.

2. The method of claim 1, wherein determining the first position comprises:
    informing an application processor (AP) of the coordinates of the first location; and
    determining, at the AP, the unrolled position of the rollable touchscreen based on the first location.

3. The method of claim 1, further comprising applying a signal at the active electrode, the signal being received by the rollable touchscreen through a gap disposed between the active electrode and the first location on the rollable touchscreen.

4. The method of claim 1, wherein detecting the active electrode comprises:
    transmitting, from the active electrode, a first signal;
    in response to transmitting the first signal, sensing a change in capacitance at each of a plurality of locations on the rollable touchscreen, the plurality of locations being arranged in rows and columns; and
    determining the first location based on the sensed change in capacitance.

5. The method of claim 4, further comprising:
    performing a further sensing measurement to detect a second location of a passive touch by
        sensing a change in capacitance at each of the plurality of locations at a further frequency different from the frequency of the first signal, and
        determining the second location based on the sensed change in capacitance.

6. The method of claim 4, further comprising:
    transmitting, from a stylus, a second signal towards the rollable touchscreen, the second signal being different from the first signal; and
    in response to transmitting the second signal, performing a further sensing measurement to detect a second location of the stylus.

7. The method of claim 6, wherein the first signal has a first frequency and the second signal has a second frequency, and wherein the first frequency is different from the second frequency.

8. The method of claim 6, wherein the first signal has a first frequency and a first duty cycle and the second signal has the first frequency and a second duty cycle, and wherein the first duty cycle is different from the second duty cycle.

9. A method for operating an electronic device comprising:
    providing a rollable display configured to be rolled into or unrolled out of a housing, the unrolled portion of the rollable display at an unrolled position extending away from the housing in a first direction, the housing comprising an active electrode configured to transmit a signal having a first frequency to be capacitively sensed by a capacitive touchscreen on the rollable display, wherein the first frequency is selected to distinguish an interaction between the capacitive touchscreen and the active electrode mounted in the housing from touch operations registered on the unrolled portion of the rollable display outside the housing;
    determining that the rollable display is detecting the signal at a first location on the capacitive touchscreen; and
    determining the unrolled position of the rollable display along the first direction based on the first location on the capacitive touchscreen.

10. The method of claim 9, wherein the capacitive touchscreen comprises a first plurality of capacitive electrodes arranged in rows across the capacitive touchscreen and a second plurality of capacitive electrodes arranged in columns across capacitive touch screen, and wherein determining that the rollable display is detecting the signal at a first location on the capacitive touchscreen comprises:
    scanning each of the columns comprising the second plurality of capacitive electrodes and measuring the change in capacitance at each intersection between each of the columns comprising the second plurality of capacitive electrodes and each respective driven row of the first plurality of capacitive electrodes; and determining the first location based on the change in capacitance between each of the rows and columns and the first frequency of the signal.

11. The method of claim 10, further comprising:
driving each of the rows comprising the first plurality of capacitive electrodes sequentially using a second frequency;
scanning each of the columns comprising the second plurality of capacitive electrodes and measuring the change in capacitance at each intersection between each of the columns comprising the second plurality of capacitive electrodes and each of the rows comprising the first plurality of capacitive electrodes; and
determining at least one first passive touch based on the change in capacitance at each intersection between the rows and columns and the second frequency.

12. The method of claim 10, further comprising:
driving and scanning each of the columns comprising the second plurality of capacitive electrodes and measuring a self-capacitance of each of the columns comprising the second plurality of capacitive electrodes with respect to ground, wherein each of the columns comprising the second plurality of capacitive electrodes are driven with a third frequency; and
determining at least one second passive touch based on the self-capacitance of each of the columns comprising the second plurality of capacitive electrodes with respect to ground and the third frequency.

13. An electronic device comprising:
a first housing;
an active electrode mounted in the first housing;
a touch sensitive display mounted within the first housing, the touch sensitive display being configured to be rolled into or unrolled out of the first housing to an unrolled position along a first direction, and wherein the touch sensitive display comprises a first plurality of capacitive electrodes arranged in rows across the touch sensitive display and a second plurality of capacitive electrodes arranged in columns across the touch sensitive display;
a processor;
a memory for storing a program to be executed in the processor, the program comprising instructions when executed cause the processor to:
determine the touch sensitive display is detecting an active electrode at a first location on the touch sensitive display from amongst a plurality of locations on the touch sensitive display configured to detect the active electrode, the detecting the active electrode comprises distinguishing an interaction between the touch sensitive display and the active electrode mounted in the first housing from touch operations registered on an unrolled portion of the touch sensitive display outside the first housing; and
determine a first position of the touch sensitive display based on the first location, the first positing being indicative of a fractional amount of the touch sensitive display outside the first housing.

14. The electronic device of claim 13, wherein the instructions to determine the first position comprise instructions to inform an application processor (AP) of the coordinates of the first location; and
determine, at the AP, the unrolled position of the touch sensitive display based on the first location.

15. The electronic device of claim 13, further comprising a gap disposed between the active electrode and the first location on the touch sensitive display.

16. The electronic device of claim 15, wherein a length of the gap is less than 1 mm.

17. The electronic device of claim 13, wherein the instructions for detecting the active electrode comprise instructions to:
transmit, from the active electrode, a first signal;
in response to transmitting the first signal, sense a change in capacitance at each of a plurality of locations on the touch sensitive display, the plurality of locations being arranged in rows and columns; and
determine the first location based on the sensed change in capacitance.

18. The electronic device of claim 17, wherein the program comprises further instructions to:
perform a further sensing measurement to detect a second location of a passive touch by
sensing a change in capacitance at each of the plurality of locations at a further frequency different from the frequency of the first signal, and
determining the second location based on the sensed change in capacitance.

19. The electronic device of claim 16, wherein the program comprises further instructions to:
transmit, from a stylus, a second signal towards the touch sensitive display, the second signal being different from a first signal transmitted from the active electrode; and
in response to transmitting the second signal, perform a further sensing measurement to detect a second location of the stylus.

20. The electronic device of claim 19,
wherein the first signal has a first frequency and the second signal has a second frequency, and wherein the first frequency is different from the second frequency; or
wherein the first signal has a first frequency and a first duty cycle and the second signal has the first frequency and a second duty cycle, and wherein the first duty cycle is different from the second duty cycle.

21. The electronic device of claim 13, wherein the active electrode comprises gold or copper.

22. The method of claim 1, wherein distinguishing the interaction between the rollable touchscreen and the active electrode comprises transmitting a first signal from the active electrode towards the rollable touchscreen at a different frequency than a second signal transmitted from a stylus towards the rollable touchscreen or transmitting a first signal from the active electrode towards the rollable touchscreen at a different time than a second signal transmitted from a stylus towards the rollable touchscreen.

23. The electronic device of claim 13, wherein the instructions to distinguish the interaction between the touch sensitive display and the active electrode comprises instructions to transmit a first signal from the active electrode towards the touch sensitive display at a different frequency than a second signal transmitted from a stylus towards the touch sensitive display or transmit a first signal from the active electrode towards the touch sensitive display at a different time than a second signal transmitted from a stylus towards the touch sensitive display.

* * * * *